US012759001B2

(12) United States Patent
Langlois et al.

(10) Patent No.: US 12,759,001 B2
(45) Date of Patent: Oct. 13, 2026

(54) FLUID PRODUCT DISPENSER

(71) Applicant: APTAR OYONNAX, Veyziat (FR)

(72) Inventors: Yann Langlois, Viriat (FR); Laurent Pivard, Dortan (FR); Florent Pouliaude, Fouqueville (FR)

(73) Assignee: APTAR OYONNAX, Oyonnax (FR)

( * ) Notice: Subject to any disclaimer, the term of this patent is extended or adjusted under 35 U.S.C. 154(b) by 121 days.

(21) Appl. No.: 18/838,162

(22) PCT Filed: Feb. 13, 2023

(86) PCT No.: PCT/FR2023/050188
§ 371 (c)(1),
(2) Date: Aug. 13, 2024

(87) PCT Pub. No.: WO2023/152456
PCT Pub. Date: Aug. 17, 2023

(65) Prior Publication Data

US 2025/0196172 A1 Jun. 19, 2025

(30) Foreign Application Priority Data

Feb. 14, 2022 (FR) .................................... 2201278
Jul. 4, 2022 (FR) .................................... 2206782

(51) Int. Cl.
*B05B 11/10* (2023.01)

(52) U.S. Cl.
CPC ...... *B05B 11/1084* (2023.01); *B05B 11/1047* (2023.01)

(58) Field of Classification Search
CPC ............ B05B 11/1084; B05B 11/1047; B05B 11/1081
USPC .................................... 222/135–137, 145.1
See application file for complete search history.

(56) References Cited

U.S. PATENT DOCUMENTS

2004/0251274 A1 12/2004 Ponton
2021/0354156 A1* 11/2021 Sasaki ................ B05B 11/1084

FOREIGN PATENT DOCUMENTS

FR 2 952 913 A1 5/2011
FR 3 040 639 A1 3/2017

OTHER PUBLICATIONS

International Search Report for International application No. PCT/FR2023/050188 dated May 9, 2023.
International Preliminary Report on Patentability dated Jan. 26, 2024 with a Translation of the Written Opinion of the International Searching Authority in Application No. PCT/FR2023/050188.

* cited by examiner

*Primary Examiner* — David J Walczak
(74) *Attorney, Agent, or Firm* — Sughrue Mion, PLLC

(57) ABSTRACT

A fluid product dispenser including at least two reservoirs, each with a pump having a valve spindle moveable back and forth along an axis X; a common connecting end piece having inlet sleeves, flexible ducts and an outlet hole, the inlet sleeves mounted on the valve spindles, the inlet sleeves connected to the outlet hole; and a common push member having a dispensing opening connected to the outlet hole, the push member moveable back and forth along the axis X. The common connecting end piece is formed of two parts connected to one another in a leak-tight manner along a bond line that extends perpendicularly to the axis X.

13 Claims, 6 Drawing Sheets

FLUID PRODUCT DISPENSER

Figure 1:
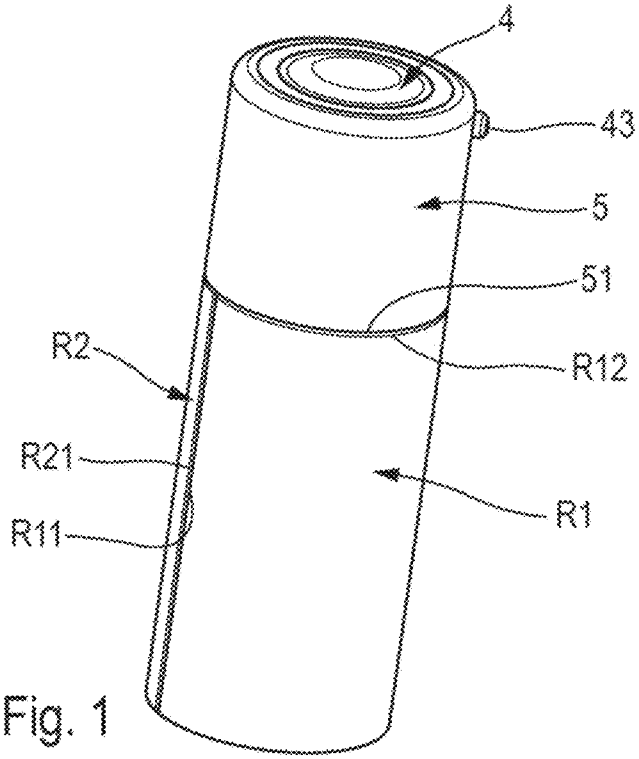

This is a National Stage Application of International Application No. PCT/FR2023/050188 filed Feb. 13, 2023, claiming priority based on French Patent Application Nos. FR2201278 filed Feb. 14, 2022 and FR2206782 filed Jul. 4, 2022.

The present invention relates to a fluid product dispenser comprising at least two reservoirs, each provided with a pump comprising a valve spindle that is moveable back and forth along an axis X. The dispenser also integrates a common connecting end piece comprising inlet sleeves mounted on the valve spindles, the inlet sleeves being connected by ducts to an outlet hole. The dispenser also integrates a common push member comprising a dispensing opening connected to the outlet hole, the push member being moveable back and forth along the axis X, driving with it, the common connecting end piece and the two valve spindles. This design is entirely conventional for a dispenser delivering a mixture of fluid products and which is commonly qualified as a duo dispenser. Trio, even more versions also exist.

Generally, the two reservoirs are separated from one another and held in place by a common part forming two receiving housings, respectively for the necks of the two reservoirs. In this case, the centre distance (horizontal spacing) and the pitch angle (mutual axial positioning) of the two valve spindles are fixed by the common part and the other parts of the dispenser are adapted to the centre distance and the pitch thus determined. The two valve spindles are located at the same axial height or at least one fixed mutual axial position and their centre distance is known.

The position is different when the mutual positioning of the two reservoirs is imposed by other parameters, in particular a direct contact between the two reservoirs. This is all the more problematic with glass reservoirs, the tolerances of which are particularly high.

The example of two glass reservoirs, each forming a body and a neck, is thus taken. It is already known that there is a significant tolerance at the neck, in particular concerning its height with respect to the body. By assembling these two reservoirs by a direct contact between their bodies, for example by gluing, it is understood that the mutual position of the two necks can vary, both in terms of centre distance and of pitch. And in the case where the bodies have complex shapes with complex mutual contact surfaces, the tolerance in terms of centre distance and of pitch increases even more. A batch of glued reservoirs with centre distance and pitch spacings of several tenths of millimetres, even more than one millimetre can thus be resulted in.

It is thus understood that the mounting of dispensing assembly on this pair of reservoirs will be very difficult.

The individual mounting of the pumps on the necks by a crimping technique would seem possible in theory, but encounters two distinct problems.

The first problem is linked to the fact that the centre distance of the necks of this type of coupled reservoirs is often low, such that the crimping head is impeded by the proximity of the other neck. Crimping is thus quite simply impossible in practice. This problem could, in theory, be surmounted by a crimping of the two reservoirs before gluing them together, but this would impose filling them beforehand, which is not usual in the assembly process.

The second problem, when the first one is not posed, resides in the fact that the common push member will act in an unbalanced manner on the two valve spindles, due to the pitch defect. In addition, the centre distance variations complicate, even prevent, the mounting of the common connecting end piece on the valve spindles and/or the mounting of the push member on the common end piece.

The individual mounting of the pumps on the necks by rings blocked by hoops leads to the same disadvantages as mounting by crimping.

The mounting of the pumps on the necks by rings blocked by a common end piece forming hoops causes an additional disadvantage due to the fact that the centre distance of the hoops does not correspond with the variable centre distance of the necks.

Thus, in any case, it is difficult, even impossible, to mount a conventional dispensing head on a pair of associated reservoirs, the reference of which for the centre distance and the pitch is not fixed on the upper annular edge of the necks. This is particularly valid for glass reservoirs, but certainly also in a lesser measure for reservoirs made of other materials, like plastic material.

The present invention aims to overcome the various disadvantages of the prior art, by defining a dispenser which is adapted to the centre distance and pitch defects of the reservoir necks.

To do this, the present invention proposes a fluid product dispenser comprising:

- at least two reservoirs, each provided with a pump comprising a valve spindle that is moveable back and forth along an axis X,
- a common connecting end piece comprising inlet sleeves, flexible ducts and an outlet hole, the inlet sleeves being mounted on the valve spindles, the inlet sleeves being connected to the outlet hole by the ducts,
- a common push member comprising a dispensing opening connected to the outlet hole, the push member being moveable back and forth along the axis X,
- characterised in that the common connecting end piece is formed of two parts connected to one another in a leak-tight manner along a bond line that extends perpendicularly to the axis X.

Thus, the common end piece is made of only two parts, while preserving the necessary versatility. The versatility or flexibility or deformability or resilience of the ducts in the axial and radial directions makes it possible to adapt the common connecting end piece to valve spindles of different centre distance and pitch. The inlet sleeves can move away or move closer by deformation of the ducts, and this both axially (pitch) and radially (centre distance). However, the outlet hole, which is located between the two inlet sleeves, advantageous halfway, only undergoes a very small movement, even none.

Preferably, the common connecting end piece can comprise a base part forming the two inlet sleeves and a cover part forming the outlet hole, the ducts being formed together by the base and cover parts. The two parts can be made of polypropylene or polyethylene.

According to an embodiment of the invention, the ducts can be substantially rigid but curved, so as to confer an acceptable deformability. This means that the ducts can accept centre distance and/or pitch variations under the action of a relatively low stress. The deformation capacity comes from the conjugation of the relative rigidity or flexibility of the chosen material and of the naturally deformable geometry, along the desired directions, of the curved shape. In practice, polypropylene or polyethylene can be used to produce the ducts, and even the common connecting end piece in its entirety. The ducts can thus each have a C-shaped configuration.

By conferring a C-shape to the ducts, the common connecting end piece can have an S-shape, with an inlet sleeve at each end of the S and the outlet hole at the centre of the S. Thus, the inlet sleeves and the outlet hole are aligned, with a C-shaped duct of each side of the line, thus forming an S. It is easily understood that this S-shape confers an increased elastic deformation capacity, while keeping its centre substantially or fully fixed. The S-shape can be deformed in the plane where the S is inscribed, but also along the axis perpendicular to this plane.

According to another feature of the invention, the common connecting end piece can comprise pins that extend into the axial extension of the inlet sleeves in the direction of the common push member, caps being more or less engaged axially on these pins according to the mutual axial position (pitch angle) of the inlet sleeves, these caps being disposed at an identical axial position, these caps coming into contact with the common push member. The more or less deep engagement of the caps on or in the pins makes it possible to compensate for a pitch defect of the valve spindles. A right valve spindle can, for example, be imagined, which is located axially higher than the left valve spindle. In this case, the right cap is more engaged on or in the right pin than the left cap is on or in the left pin. This is the case, when the caps are located at the same axial height (zero pitch angle). It can also be considered to dispose the caps with an axial offset which is constant between them, which is independent of the pitch defects of the pins.

According to a practical embodiment, the pins and the caps can comprise profiles which have more or less interference of material according to the more or less large or small axial engagement of each cap on its respective pin. For example, one or more vertical ridges of the cap can be considered, which punch out an annular reinforcement of the pin, or vice versa.

In practice, the definitive positions of the caps on their respective pins can be reached by a maximum sinking, which can be done in the factory, for example by a piston on the assembly machine.

It must be noted that the implementation of pins and of caps can be done independently of the flexibility of the ducts, such that an individual protection could be sought for this feature. Operationally, the pins engaging with the caps fulfil a pitch defect compensation means function of the valve spindle, and more generally of the reservoir necks.

Also, according to another feature of the invention, the dispenser further comprises fixing rings and blocking hoops, the pumps being mounted on the reservoirs by means of fixing rings, which are held in place by the blocking hoops engaged axially around the fixing rings, the blocking hoops being connected together while being movable against one another, such that the mutual position of the two blocking hoops is adaptable according to the mutual position of the two fixing rings.

According to an embodiment of the invention, the blocking hoops can be formed of one piece by a hoop part, which defines at least one flexible connection between the two blocking hoops.

According to another embodiment of the invention, a hoop part can define at least one insertion housing, in which a blocking is hoop received slidingly. Advantageously, the insertion housing comprise sliding ridges and the blocking hoop comprises sliding grooves engaging with the sliding ridges to guide the blocking hoop moving away from/closer to the other blocking hoop. Preferably, the blocking hoop is initially connected to the hoop part by a material bridge to be broken.

It must be noted that the implementation of such common hoop parts (with two blocking hoops connected together in one piece by at least one flexible connection or with one or two sliding blocking hoops) can be done independently of the flexibility of the ducts, such that an individual protection could be sought for this feature. Operationally, these blocking hoops fulfil a centre distance variation compensation means function of the reservoir necks.

According to another aspect of the invention, the common push member can slide axially in a cowl which is mounted on the common hoop part, the cowl advantageously defining a window in which the dispensing opening of the common push member is housed. Thus, the common hoop part serves as a support for the cowl, the lower edge of which can abut on the reservoirs, for example at a shoulder formed together by the two reservoirs. In more detail, the hoop part can comprise at least two mounting zones for the cowl, these mounting zones being connected to the one-piece blocking hoops by flexible connections. Preferably, the mounting zones are rigid, the mutual position of the mounting zones in a plane perpendicular to the axis X being practically insensitive to the mutual position variations of the fixing rings in a plane perpendicular to the axis X. A two-part design can also be imagined for the hoop part: an 8-shaped inner part forming the two hoops and an external crown connected to the 8-shaped part and which would receive an aesthetic cowl.

Advantageously, the two reservoirs, preferably made of glass, are in contact with one another, such that their mutual position depends on this mutual contact. Although this feature is at the basis of the problem of the invention, it can serve to make the dispenser of the invention stand out.

The invention will now be more fully described in reference to the accompanying drawings, giving as a non-limiting example, an embodiment of the invention.

Figure 2:
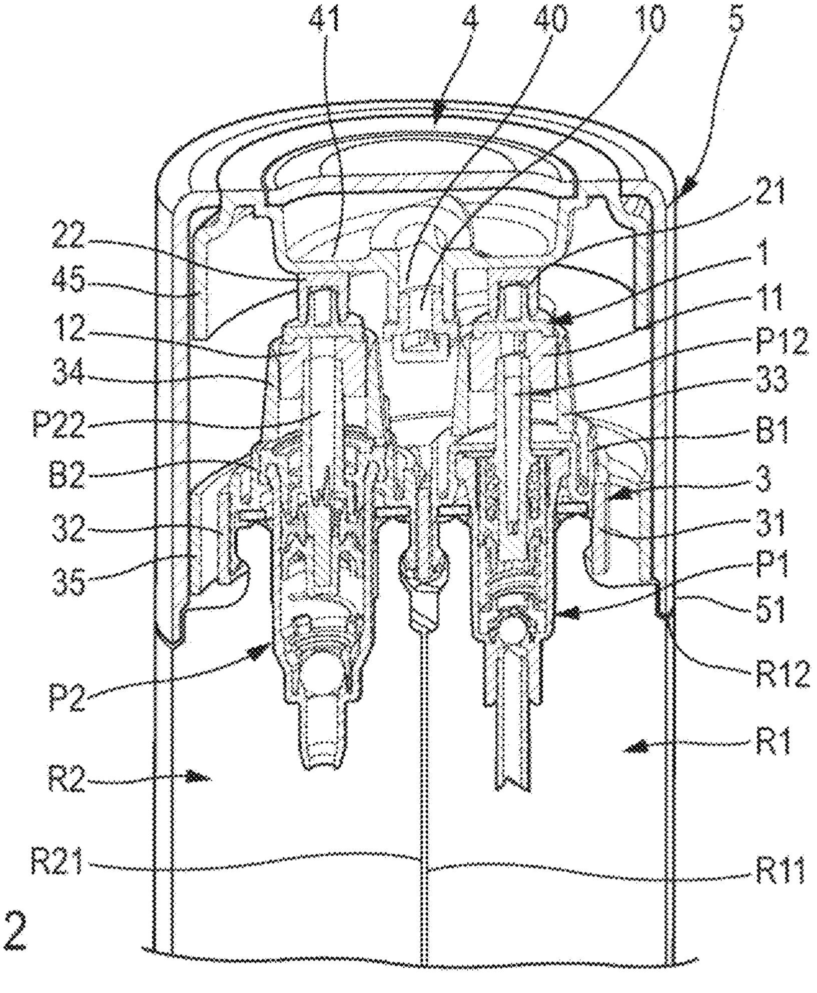
Figure 3:
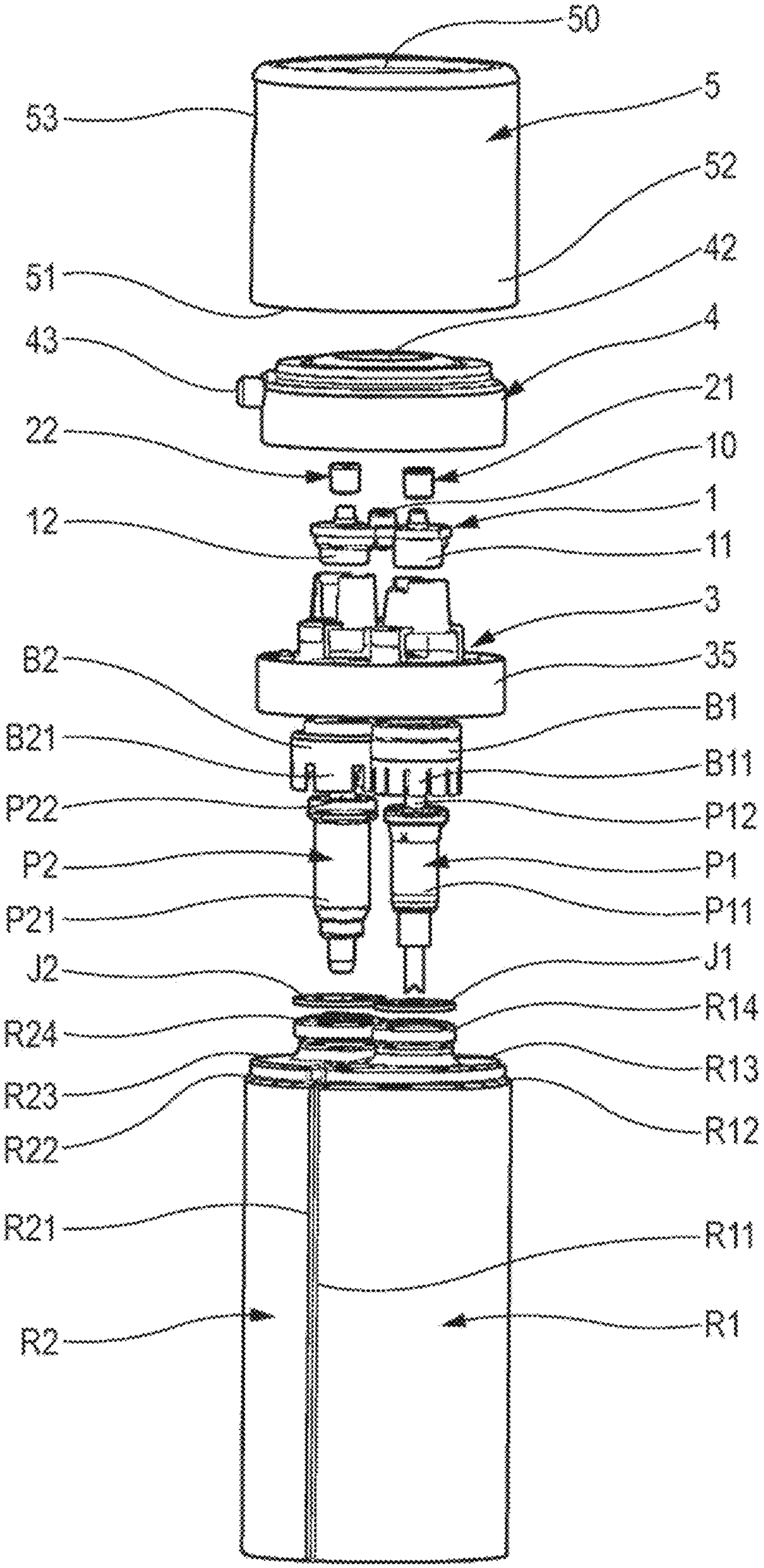
Figure 4:
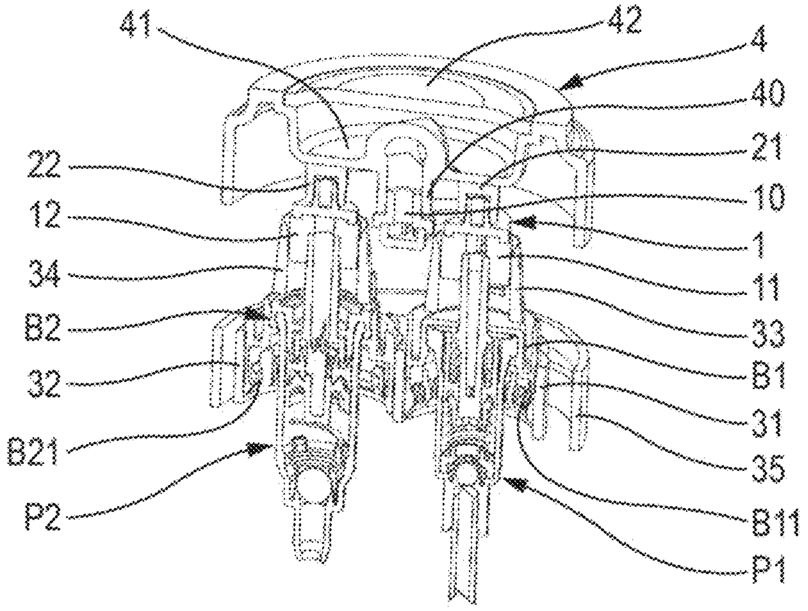
Figure 5:
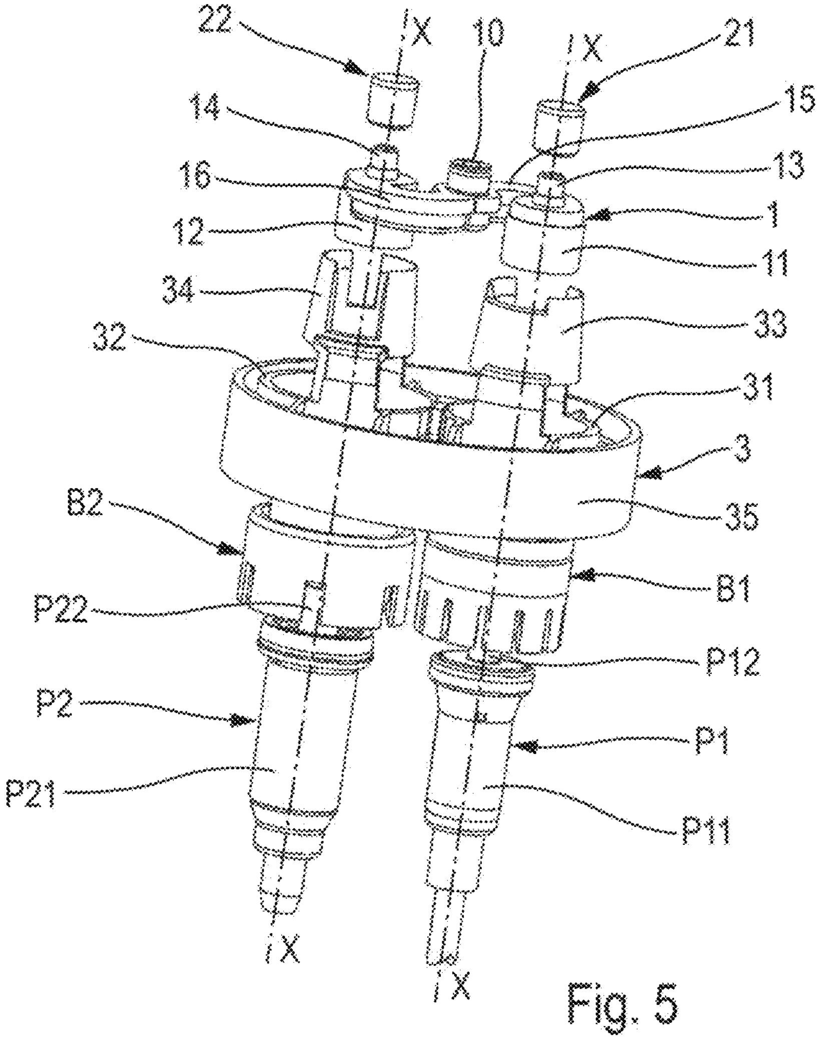
Figure 6:
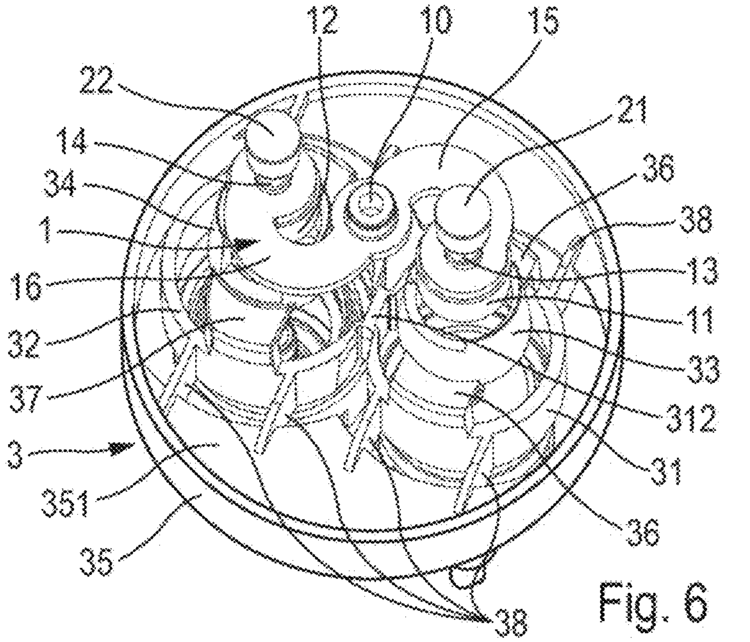
Figure 7A:
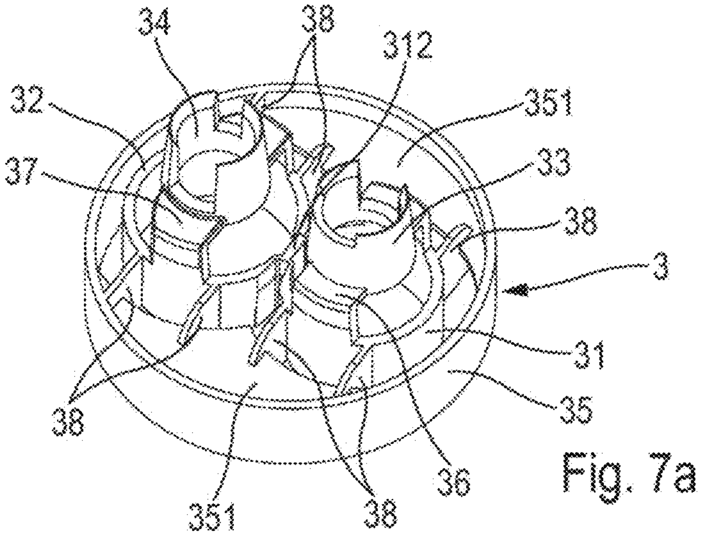
Figure 7B:
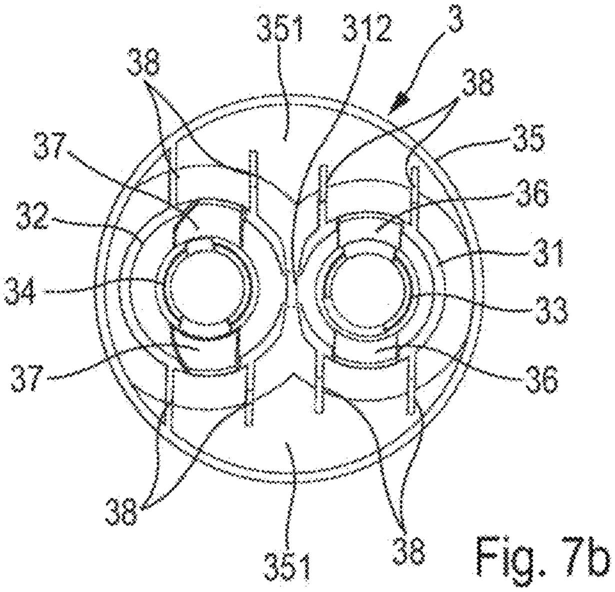

In the figures:

FIG. 1 is a perspective view of a fluid product dispenser according to the invention, FIG. 2 is a vertical, cross-sectional, enlarged view through the dispenser of FIG. 1, FIG. 3 is an exploded, perspective view of the dispenser of FIGS. 1 and 2, FIG. 4 is a perspective and vertical, cross-sectional view of a part of the dispenser of FIGS. 1 to 3, FIG. 5 is an exploded, perspective view of a part of the dispenser of FIGS. 1 to 3, FIG. 6 is a view similar to that of FIG. 5, with a different viewing angle, FIG. 7*a* is a perspective view of the hoop part of the dispenser of the invention, FIG. 7*b* is a top view of the hoop part of FIG. 7*a,*

Figure 8A:
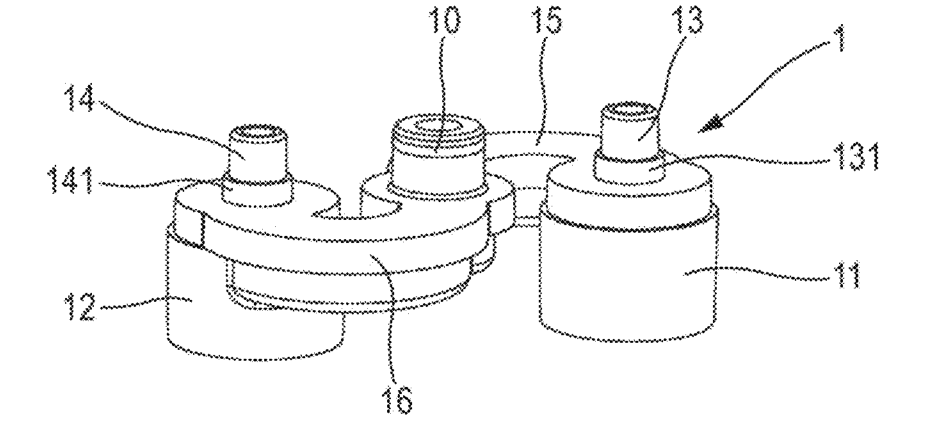
Figure 8B:
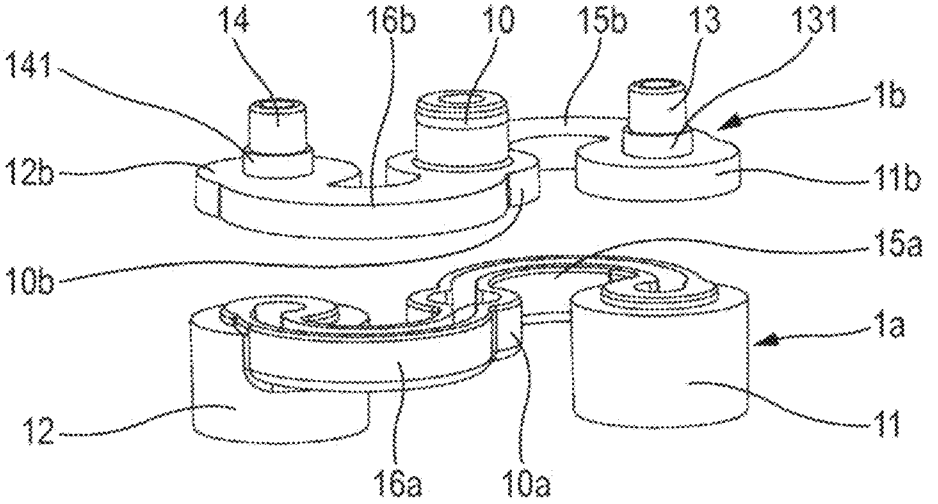

FIG. 8*a* is a greatly enlarged, perspective view of the common connecting end piece of the dispenser of the invention, FIG. 8*b* is an exploded, perspective view of the end piece of FIG. 8*a,*

Figure 9:
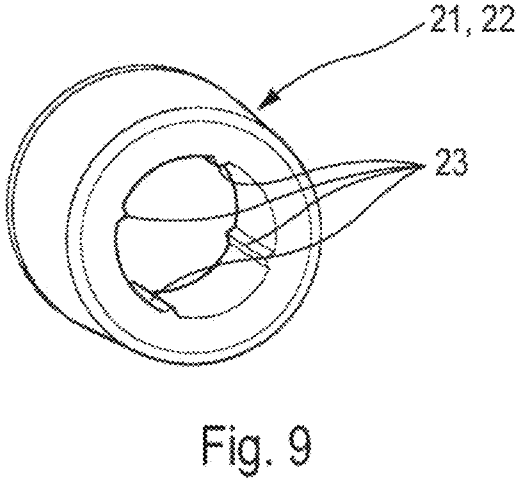
Figure 10A:
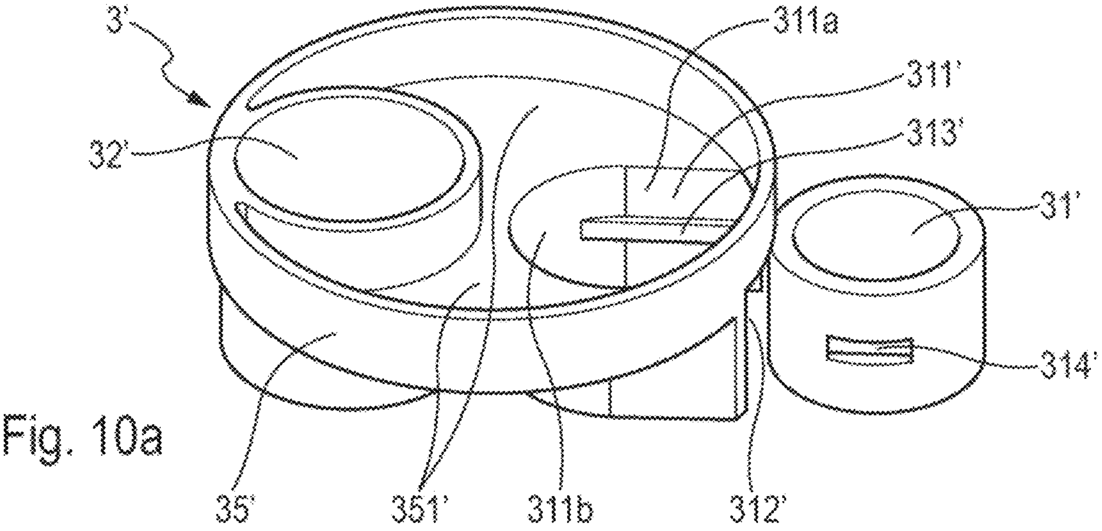
Figure 10B:
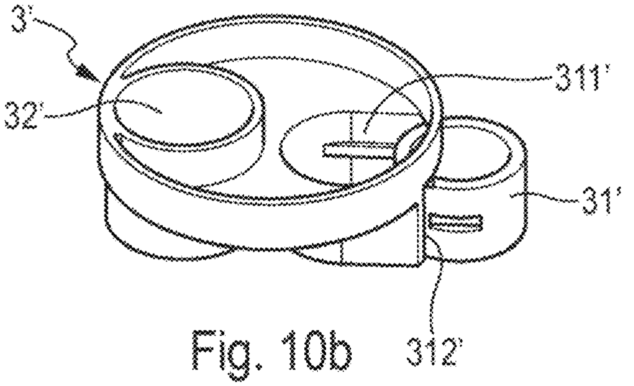
Figure 10C:
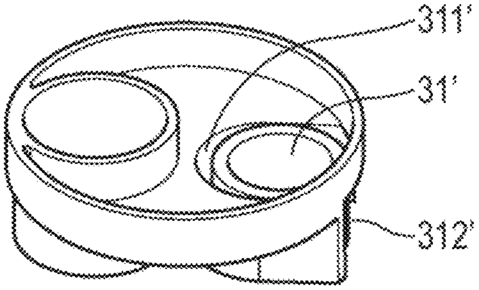
Figure 11:
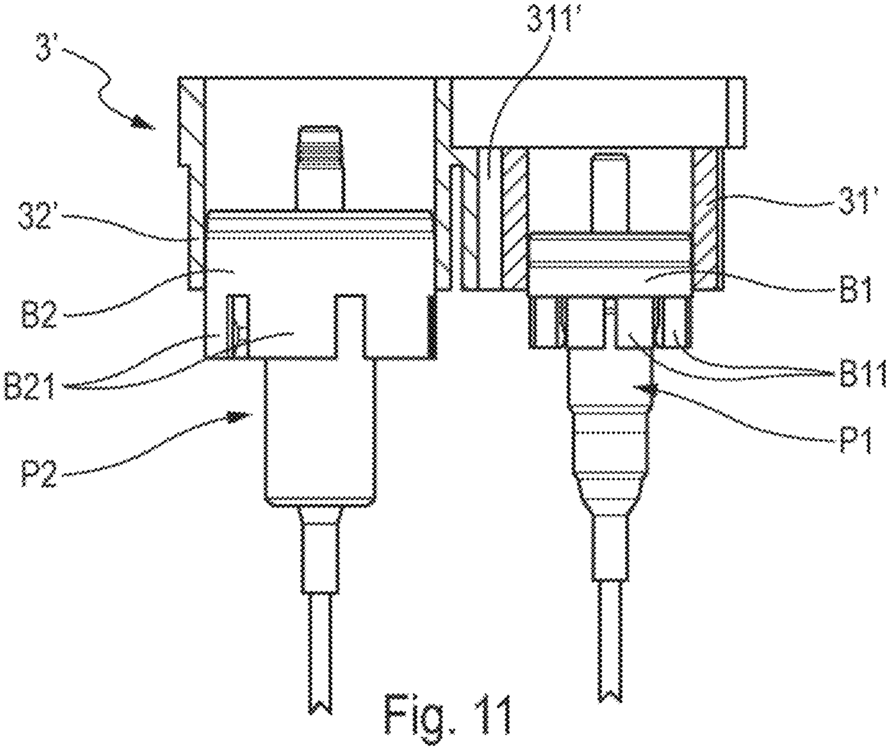

FIG. 9 is a very greatly enlarged view of a cap of the dispenser of the invention, FIGS. 10*a*, 10*b* and 10*c* are schematic, perspective views illustrating the hoop part according to a second embodiment of the invention, in different mounting phases, and FIG. 11 is a vertical, cross-sectional view through the hoop part of FIGS. 10*a*, 10*b* and 10*c*, during mounting on the fixing rings of the pumps.

The dispenser which has been used to illustrate the present invention is a duo-type dispenser, comprising two fluid product reservoirs R1 and R2, as well as two dispensing members, two pumps P1 and P2. A dispenser with three reservoirs and three pumps, even more, would also have been able to be used, to illustrate the present invention.

In FIGS. 1 to 3, it can immediately be noted that the two reservoirs R1, R2 are in direct contact with one another at two contact surfaces R11 and R21. These two surfaces R11 and R21 extend, in this case, in a vertical plane, but it can also be imagined that these two surfaces are inclined, even curved. The two contact surfaces R11 and R21 can be connected to one another by any suitable technique, like for example by gluing with any suitable material, such as an adhesive, enamel, sol-gel, etc. Naturally, this type of connection can cause more or less pronounced offsets between the two reservoirs. Mutual position tolerance of the reservoirs R1 and R2 can thus be referred to.

At their upper part, the reservoirs R1 and R2 each form a shoulder segment R12, R22 which together forms a more or less contiguous annular shoulder according to the mutual position tolerance of the reservoirs. Beyond these shoulder segments, each reservoir R1, R2 forms a plate segment R13, R23 which together form a substantially contiguous plate according to the mutual position tolerances of the two reservoirs. From these plate segments, each reservoir forms a neck R14, R24 which projects upwards. The horizontal distance or centre distance between the two necks R14 and R24 can vary according to the manufacturing tolerance of the necks, but also according to the mutual position tolerance of the two reservoirs R1 and R2. The same applies for the axial positioning or pitch at the upper annular edges of the two necks R14 and R24. A pitch defect can thus be observed according to the manufacturing tolerances of the necks, but also according to the mutual tolerance of the two reservoirs due to the close contact between the surfaces R11 and R21.

Consequently, it is impossible to guarantee a constant centre distance and a zero pitch angle between the two necks R14 and R23. Centre distance defect or tolerance and pitch angle or pitch defect or tolerance can thus be referred to. These defects or tolerances naturally come from the mutual positions of the two reservoirs, the reference of which is located at the two contact surfaces R11, R21. Traditionally, these defects and tolerances do not exist when the reference is placed at the upper annular edge of the two reservoir necks. Thus, it can be generally said that this centre distance and pitch defect or tolerance is encountered, as soon as the reference is not placed at the annular upper edges of the two reservoir necks. The mutual contact of the two reservoirs at the contact surfaces R11, R21 is only one example from among others which causes this centre distance and/or pitch defect or tolerance.

It is thus assumed that on a batch of coupled reservoir assemblies, the centre distance and the pitch are not constant. This lets the difficulties in mounting the high assembly of the dispenser be anticipated. However, the present invention makes it possible to attenuate, even remove, this mounting and operating difficulty, as will be seen below.

Starting with this coupled reservoir R1 and R2 assembly, the first mounting step consists of mounting the two pumps P1 and P2 on and in the necks R14 and R24. The particular pump type is not critical for the invention and will therefore not be described in detail. Very succinctly, each pump P1, P2 comprises a pump body P11, P21, as well as a valve spindle P12, P22 which is axially moveable in its respective pump body P11, P21 back and forth against a return spring. This is absolutely conventional for a pump in the fields of perfumery, cosmetics, or even pharmacy.

To guarantee the sealing at the necks R14 and R24, neck seals J1 and J2 can be used, which are engaged around the pump bodies P11 and P21 which form a bezel making it possible to flatten the seals J1 and J2 on their respective neck. To hold the pumps P1, P2 in place, fixing rings B1 and B2 are used which each form fastening tabs B11 and B21, which engage around the necks R14, R24, absolutely conventionally.

To block the fastening tabs B11, B21 of the two fixing rings B1, B2, a hoop part 3 is provided according to the invention, which is more visible in FIGS. 6, 7*a* and 7*b*. This hoop part 3, which is preferably made of one piece by injection moulding of a suitable plastic material, comprises a mounting crown 35, which is cylindrical and annular, in this case. However, other configurations can be imagined, making it possible to define at least one mounting zone, and advantageously two opposite zones, which are connected to one another, or separate. In the case of the mounting crown 35, it can be said that two mounting zones are continuously connected to only form one single extended mounting zone. Inside this mounting crown 35, the hoop part 3 defines two areas 351, disposed diametrically opposite. Between these two areas 351, the hoop part 3 comprises two blocking hoops 31 and 32, respectively for the two fixing rings B1 and B2. These blocking hoops 31, 32 are presented in the form of cylindrical collars adapted to clampingly engage around the fastening tabs B11 and B21 of the two fixing rings B1 and B2. The two blocking hoops 31, 32 are connected to one another by a common wall 312, such that the two hoops 31 and 32 can be moved against one another so as to modify their centre distance and/or their pitch. On the other hand, it can be noted that the two blocking hoops 31 and 32 are connected to the two areas 351 by several flexible connections 38, in this case, eight. It is thus easily understood that the two blocking hoops 31 and 32 can be moved inside the mounting crown 35, and even against one another, both axially and radially, so as to modify their centre distance and/or their pitch. It can thus be said that the blocking hoops 31 and 32 are mounted “floatingly” inside the mounting crown 35. Naturally, the degree of freedom of movement of the two hoops 31 and 32 is limited to a few tenths of millimetres, even one millimetre. It can also be imagined that in the case of greater centre distance of the reservoirs, the two hoops 31 and 32 are not connected to one another, but fully detached from one another. The common wall 312 would thus be removed, and the two hoops 31, 32 could be connected to the two areas 351 by flexible connections. In a variant, the two separate hoops could be mounted in the mounting crown 35.

In this way, it is possible to mount the hoop part 3 on the two fixing rings B1, B2 by engaging the blocking hoops 31 and 32 around the fastening tabs B11 and B21. In the final mounting position, the lower edge of the mounting crown 35 can abut on the shoulder formed by the shoulder segments R13 and R23, while the two blocking hoops 31 and 32 can be positioned with a centre distance and/or pitch defect, thanks to the flexible connections 38 and the common wall 312.

Advantageously, each blocking hoop 31, 32 is provided with an axial guiding socket 33, 34 which is supported by two tabs 36 and 37. More specifically, the tabs 36 extend diametrically opposite from the upper edge of the blocking hoop 31 by each forming a bend towards the inside to join the axial guiding socket 33. The same applies for the blocking hoop 32: the tabs 37 extend diametrically opposite from the upper edge of the hoop 32 by forming a bend to join the axial guiding socket 34. Thus, each axial guiding socket

33, 34 is presented in the form of a small turret which is suspended above its blocking hoop 31, 32 by pairs of bent tabs 36, 37. Each socket extends coaxially to its blocking hoop.

As can be seen in FIG. 2, the valve spindles P12 and P22 extend axially inside the guiding sockets 33 and 34. But, like the guiding sockets 33 and 34 are positioned with respect to their respective neck, the sockets 33 and 34 are perfectly positioned with respect to the valve spindles P11 and P22. In other words, the blocking hoops and the axial guiding sockets are positioned with the same centre distance and pitch defect as the necks R14 and R24.

According to the invention, the dispenser implements a common connecting end piece 1, which is more visible in FIGS. 8*a* and 8*b*. This end piece 1 comprises two inlet sleeves 11 and 12, intended to be interlocked or sleeved on the free ends of the two valve spindles P12 and P22. The end piece 1 also comprises an outlet hole 10 that extends between the two sleeves 11 and 12. The outlet hole 10 is advantageously disposed halfway between the two sleeves 11 and 12. The latter are connected to the outlet hole 10 by two ducts 15 and 16, which have the feature of being flexible, such that the centre distance and/or the pitch of the two sleeves 11 and 12 can vary by deformation of the ducts 15 and 16, while leaving the outlet hole 10 substantially static, due to its axial central positioning. The ducts 15 and 16 are flexible, but with a limited degree of deformation. They are made of a substantially rigid material, but with a curved configuration. It can be said that each duct 15, 16 has a C-shaped configuration, such that the end piece 1 in its entirety has an S-shaped configuration. If a line is traced, passing through the two sleeves 11, 12 and the outlet hole 10, it can be said that the duct 15 extends from a side of this line, while the duct 16 extends from the other side of this line. In a variant, the two ducts 15 and 16 could be on the same side of the line and form an E.

By referring to FIG. 8*b*, it can be noted that the common connecting end piece 1 comprises two parts, namely a base part 1*a* forming the two inlet sleeves 11 and 12 and a cover part 1*b* forming the outlet hole 10. The ducts 15 and 16 are formed by the assembly of the two parts 1*a* and 1*b*. More specifically, the base part 1*a* forms two chutes 15*a* and 16*a* which connect the inlet sleeves 11 and 12 to a hole base 10*a*. As regards the cover part 1*b*, it forms two covers 15*b* and 16*b* which connect the sleeve covers 11*b* and 12*b* to a hole cover 10*b*. Once the cover part 1*b* sealingly connected to the base part 1*a*, the sleeves 11 and 12 are closed by the sleeve covers 11*b* and 12*b*, the outlet hole 10 is closed by the hole cover 10*a* and the flexible ducts 15 and 16 are formed by the covers 15*b* and 16*b* connected to the chutes 15*a* and 16*a*, respectively. It can be noted that the joining line of the two parts 1*a* and 1*b* extends horizontally, i.e. in a plane perpendicular to the axis of the pumps. The two parts 1*a* and 1*b* can be simply snap-fitted on one another or also glued or welded.

The common connecting end piece 1 is thus mounted on the valve spindles P12, P22 by sleeving of the inlet sleeves 11 and 12, and this whatever the centre distance and/or pitch defect of the valve spindles. The inlet sleeves 11 and 12 are accommodated to these centre distance and/or pitch tolerance defects by deformation of the ducts 15 and 16, while keeping the outlet hole 10 substantially static.

Advantageously, each inlet sleeve 11, 12, or more specifically its cover 11*b*, 12*b*, is provided with a pin 13, 14 that extends axially. It can be said that the pins 13, 14 extend axially upwards in the extension of the sleeves 11 and 12. Thus, the outlet hole 10 is disposed halfway between these two pins 13 and 14. Preferably, the pins 13 and 14 comprise a baseplate 131, 141 of increased diameter.

According to the invention, the dispenser also comprises two caps 21 and 22 which are engaged on the pins 13 and 14, respectively. The caps 21 and 22 are engaged more or less deeply around the pins 13 and 14 according to the pitch offset defect of the two pins 13 and 14, as well as according to the desired pitch offset of the caps. For a zero pitch angle offset of the caps 21, 22, and a pin 13 that extends axially higher than the pin 14, the cap 21 will be engaged more deeply around the pin 13 than the cap 22 around the pin 14. The more or less pronounced engagement of the caps 21, 22 on their respective pin 13, 14 can be ensured by the punching out of the ridges 23 formed inside the caps 21, 22 on the baseplates of increased diameter 131 and 141 of the pins 13 and 14. Similarly, the caps 21, 22 can also be mounted on the pins 13, 14 with a non-zero pitch angle, i.e. with a cap higher than the other.

Finally, the centre distance defect is accommodated by the deformation capacity of the ducts 15 and 16 and the pitch defect is accommodated by the more or less deep engagement of the caps 21 and 22 on their respective pins 13 and 14. Finally, an outlet hole 10 is disposed, which is centred and a zero pitch reference surface formed by the aligned upper wall of the two caps 21 and 22.

According to the invention, the dispenser also comprises a push member 4 forming a central sleeve 40 engaged with the outlet hole 10 of the end piece 1. This central sleeve 40 is connected to a dispensing opening 43, which can be lateral. The push member 4 also comprises a support disc 41 which comes into contact with the caps 21 and 22. The push member 4 naturally defines an upper bearing surface 42 on which the user can axially bear to move it. The push member 4 advantageously comprises a substantially cylindrical guiding skirt 45 enabling an axial sliding movement of the push member 4.

The dispenser of the invention also comprises a cowl 5 defining a wide upper opening 50 to receive the push member 4. At its opposite end, the cowl 5 forms a lower annular edge 51 intended to engage with the shoulder R12, R22 of the two reservoirs. To hold the cowl 5, its lower part 52 is engaged around the mounting crown 35 of the hoop part 3. This can be seen in FIG. 2. Retaining profiles can be formed at the mounting crown 35 and/or the lower part 52 of the cowl 5. The cowl 5 also forms a side window 53 for the passage of the dispensing opening 43 of the push member 4.

By referring again to FIG. 2, it is now understood that the push member 4 is axially guided by sliding of its guiding skirt 45 inside the cowl 5. This guarantees that the push member 4 does not suffer any pitch defect. The final position of the two caps 21 and 22 on their respective pins 13 and 14 can be reached in the factory during the assembly of the dispenser, for example by means of a piston of the assembly machine. This piston makes it possible to position the two caps 21 and 22 with a predetermined pitch angle, which can be zero or not. The correction of the pitch defect during the factory assembly makes it possible for the push member 4 to deliver the predefined volume of the two liquids, repeatably.

Then, the dispenser can be used absolutely conventionally by bearing on the push member 4 so as to depress it inside the cowl 5. The movement of the push member 4 leads to the movement of the valve spindles P12 and P22 in their respective pump bodies P11, P21 by way of connecting sleeves 11, 12, pins 13, 14 and caps 21, 22. The fully axial movement of the sleeves 11 and 12 is ensured by the axial guiding sockets 33 and 34.

It must be noted that the common connecting end piece 1 can be implemented on the pumps P1 and P2 which are fixed on the necks R14, R24 by mounting means other than the fixing rings B11, B21 and the hoop part 3. For example, it can be imagined to mount the pumps on the necks by crimping or also by screwing. Conversely, it is possible to implement the hoop part 3 without the common connecting end piece 1. However, their cumulative implementation is advantageous.

Preferably, the reservoirs R1 and R2 are made of glass, but other suitable materials can be used.

Instead of the two caps 21 and 22, it can be provided that the inlet sleeves 11 and 12 are more or less engaged on the valve spindles P12 and P22, the support disc 41 of the push member 4, thus directly bearing on the common connecting end piece. This variant, not represented, makes it possible to remove the two caps 21 and 22.

By now referring to FIGS. 10*a*, 10*b*, 10*c* and 11, a second embodiment can be seen for the hoop part, which is referenced 3'. This hoop part 3', contrary to that 3 of the first embodiment, only forms one of the two blocking hoops, in this case, the hoop 32', the other hoop 31' being a part which is connected to the hoop part 3'. However, it is not excluded that the hoop 31' is moulded in one piece with the hoop part 3', by being connected by a material bridge to be broken. By referring to FIG. 10*a*, it is seen that the hoop part 3' forms the hoop 32', the mounting crown 35' and the areas 351', just like the hoop part 3. However, the hoop part 3' further forms an insertion housing 311' which is laterally accessible by an access passage 312', which is located just below the crown 35', opposite the location where the hoop 32' touches the crown 35'. The housing 311' comprises at least one pair of sliding ridges 313', which are disposed parallel and opposite. The housing 311' can, for example, comprise two parallel and opposite flat walls 311*a*, adjacent to the access passage 312' and a semi-cylindrical bottom wall 311*b*, which connects the two flat walls 311*a*. The sliding ridges 313' extend horizontally on the flat walls 311*a* and can end at the semi-cylindrical bottom wall 311*b*.

The blocking hoop 31' can be presented in the form of a cylindrical socket, the external wall of which forms two sliding grooves 314', which are disposed parallel and opposite. The hoop 31', which can initially be connected to the hoop part 3' by the bridge to be broken, can be detached from the hoop part 3', and then inserted in the housing 311' of the hoop part 3' through the access passage 312'. This can be seen in FIG. 10*b*. The sliding grooves 314' of the hoop 31' will be engaged in the sliding ridges 313' of the housing 311'. Subsequently, the hoop 31' is secured to the hoop part 3', while being able to slide into the housing 311', moving closer to or moving away from the hoop 32'. The sliding axis of the hoop 31' extends diametrically through the hoop 32'.

Without moving away from the scope of the invention, it can be considered to produce the hoop 32' in the same way as the hoop 31', such that the hoop part would thus form two insertion housings.

The hoop part 3', with its sliding hoop 31', can be mounted on the fixing rings B1, B2 of the pumps P1, P2, as represented in FIG. 11. The hoop 31' will be moved into its housing 311' according to the spacing of the rings B1, B2, the centre distance of which depends on the spacing of the necks of the two reservoirs.

Thanks to the invention, the centre distance and/or pitch defects is compensated for the necks of the reservoirs.

The invention claimed is:

1. A fluid product dispenser comprising:

at least two reservoirs, each provided with a pump comprising a valve spindle that is moveable back and forth along an axis X, a common connecting end piece comprising inlet sleeves, flexible ducts and an outlet hole, the inlet sleeves being mounted on the valve spindles, the inlet sleeves being connected to the outlet hole, a common push member comprising a dispensing opening connected to the outlet hole, the push member being moveable back and forth along the axis X, wherein the common connecting end piece is formed of two parts connected to one another in a leak-tight manner along a bond line that extends perpendicularly to the axis X.

2. The dispenser according to claim 1, wherein the common connecting end piece comprises a base part forming the two inlet sleeves and a cover part forming the outlet hole, the flexible ducts being formed together by the base and cover parts.

3. The dispenser according to claim 2, wherein the base part forms two chutes which connect the inlet sleeves at a hole base, the cover part forms two covers which connect the sleeve covers to a hole cover, such that once the cover part sealingly connected to the base part, the sleeves are closed by the sleeve covers, the outlet hole is closed by the hole cover and the flexible ducts are formed by the covers connected to the chutes, respectively.

4. The dispenser according to claim 1, wherein the ducts are rigid but curved, so as to confer a limited deformability.

5. The dispenser according to claim 1, wherein the ducts each have a C-shaped configuration.

6. The dispenser according to claim 1, wherein the common connecting end piece comprises pins that extend into an axial extension of the inlet sleeves in a direction of the common push member, the dispenser further comprising caps, which are engaged axially on these pins according to a mutual axial position of the inlet sleeves, these caps being disposed at an identical axial position, these caps coming into contact with the common push member.

7. The dispenser according to claim 6, wherein the pins and the caps comprise profiles which punch out material according to the large or small axial engagement of each cap on its respective pin.

8. The dispenser according to claim 1, further comprising fixing rings and blocking hoops, the pumps being mounted on the reservoirs by means of the fixing rings, which are held in place by the blocking hoops engaged axially around the fixing rings, the blocking hoops being connected together, while being movable against one another, such that a mutual position of the two blocking hoops is adaptable according to a mutual position of the fixing rings.

9. The dispenser according to claim 8, wherein the blocking hoops are formed of one piece by a hoop part, which defines at least one flexible connection between the blocking hoops.

10. The dispenser according to claim 8, wherein a hoop part defines at least one insertion housing, in which one of the a blocking hoops is received slidingly.

11. The dispenser according to claim 10, wherein the insertion housing comprises sliding ridges and the blocking hoop comprises sliding grooves engaging with the sliding ridges to guide the blocking hoop moving away from/closer to another blocking hoop.

12. The dispenser according to claim 10, wherein the blocking hoop is initially connected to the hoop part by a material bridge to be broken.

13. The dispenser according to claim 8, wherein each blocking hoop is provided with an axial guiding socket for axial guiding of the valve spindles.

* * * * *